United States Patent [19]

Reichardt

[11] Patent Number: 4,795,402
[45] Date of Patent: Jan. 3, 1989

[54] RESILIENT SHAFT COUPLING

[75] Inventor: Peter Reichardt, Ludwigsburg, Fed. Rep. of Germany

[73] Assignee: Hackforth GmbH & Co. KG, Herne, Fed. Rep. of Germany

[21] Appl. No.: 66,827

[22] Filed: Jun. 25, 1987

[30] Foreign Application Priority Data

Jun. 25, 1986 [DE] Fed. Rep. of Germany ....... 3621187

[51] Int. Cl.⁴ .............................................. F16D 3/68
[52] U.S. Cl. ....................................... 464/74; 464/76; 464/83
[58] Field of Search .................. 464/51, 73, 74, 76, 464/83

[56] References Cited

U.S. PATENT DOCUMENTS

| | | | |
|---|---|---|---|
| 3,372,561 | 3/1968 | Howard et al. | 464/74 X |
| 3,505,832 | 4/1970 | Braithwaite | 464/76 |
| 3,621,675 | 11/1971 | Conaghan et al. | 464/83 |

FOREIGN PATENT DOCUMENTS

| | | | |
|---|---|---|---|
| 1067644 | 10/1959 | Fed. Rep. of Germany . | |
| 1380940 | 1/1975 | United Kingdom | 464/83 |
| 1496358 | 12/1977 | United Kingdom | 464/74 |

*Primary Examiner*—Daniel P. Stodola
*Attorney, Agent, or Firm*—Becker & Becker, Inc.

[57] ABSTRACT

A resilient shaft coupling having two metal parts that include an inner coupling ring and, coaxial thereto, an outer coupling ring. The facing generated surfaces of the rings are formed with a number of substantially radial cams or dogs which mesh with one another alternately in the circumferential direction and extend to near the pertaining opposite generated surface. Each two circumferentially consecutive cams or dogs form a pair whose adjacent surfaces are concave and delimit a chamber whose longitudinal axis extends parallel to the rotational axis of the coupling, and in which a resilient coupling member is disposed. The coupling members are radially biased or pre-loaded by a predetermined amount, and are secured to the generated surfaces of the inner and outer ring coupling rings. With the coupling in its rest position, gaps or spaces are present between each resilient coupling member and each cam or dog, and permit the members to deform freely and thus to be stressed in shear. The advantage of this shear compression is that the coupling has a very reduced torsional stiffness at low torques, and operates without backlash or play at low torques.

7 Claims, 2 Drawing Sheets

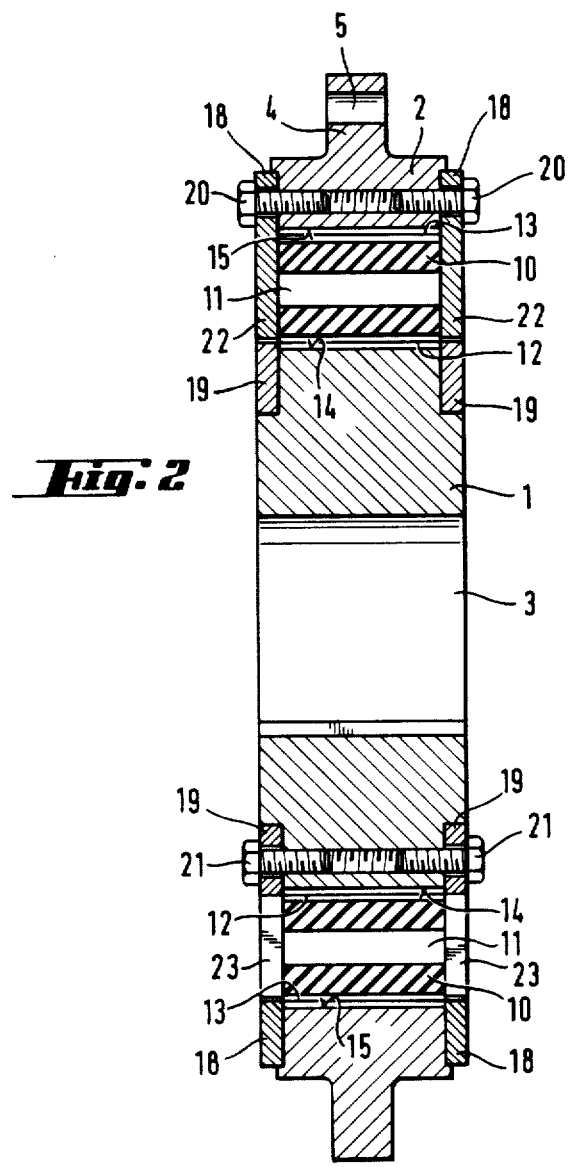

RESILIENT SHAFT COUPLING

BACKGROUND OF THE INVENTION

The present invention relates to a resilient shaft coupling having two metal parts, one of which can be connected to an input, the other to an output, with torque being adapted to be transmitted between these parts via a number of circumferentially consecutive resilient coupling members that are made of rubber or the like; the metal parts comprise an inner coupling ring and, coaxial thereto, an outer coupling ring, with those generated surfaces of the rings that face one another having formed therein a number of alternately interengaging (in the circumferential direction) and substantially radially extending cams, dogs, or teeth that extend over the axial length of the coupling rings and to a location near the pertaining opposite generated surface; each two circumferentially consecutive cams or dogs form a pair whose facing surfaces are concave and delimit a chamber, the longitudinal axis of which extends parallel to the rotational axis; a resilient coupling member is disposed in the chamber, with the shape of the resilient coupling members before installation being substantially that of a circular rod of a length corresponding substantially to the axial length of the coupling rings; upon installation, the resilient coupling members are subjected to a predetermined radial loading.

Resilient shaft couplings wherein the torque is transmitted between circular coaxial coupling hubs that have interengaging cams, dogs, or teeth via a number of circumferentially consecutive resilient rubber coupling members are known in a variety of constructions as so-called positive or dog couplings; the basic constructon thereof is disclosed by German Auslegeschrift No. 10 67 644 Croset dated Oct. 22, 1959, corresponding to U.S. Pat. No. 2,873,590-Croset dated Feb. 17, 1959.

In this known coupling, chambers are provided each being adapted to receive a circular-section rubber coupling member disposed between every two adjacent cams or dogs; the chambers are of a size and design such that, with the coupling unloaded, the resilient coupling member in the chamber does not contact the cams or dogs that delimit the latter, i.e., each individual resilient coupling member extends in the circumferential direction with a reduced clearance between the cams or dogs. Consequently, when a torque is applied to the coupling, its torsional stiffness near its neutral point is undefined, but once the reduced clearance has been taken up, and the resilient coupling members experience compression, torsional stiffness rises very rapidly to high values as torque continues to be applied.

In a coupling system of this type, it is impossible to provide low defined levels of torsional stiffness in the low-torque range after the clearance has been taken up. The result of this, for example in vehicle drives having a combustion engine, is the typical "transmission clatter" associated with starting at a low speed.

It is an object of this invention to improve the design of a resilient shaft coupling of the positive type in such a way that its torsional stiffness is very reduced at low torques, that it retains this low torsional stiffness at zero average useful torque, and that it operates in this condition without clearance and without any impairment of torsional stiffness at full load as compared with known resilient positive couplings that have intermediate resilient coupling members. Furthermore, the novel resilient shaft coupling is intended to be highly reliable in operation, to require little servicing, and to be able to be manufactured economically.

BRIEF DESCRIPTION OF THE DRAWINGS

These and other objects and advantages of the present invention will appear more clearly from the following specification in conjunction with the accompanying drawings, in which:

FIG. 2 is a side view of the resilient shaft coupling with sectioned views in axial planes along the line II—II of FIG. 1.

SUMMARY OF THE INVENTION

Figure 1:
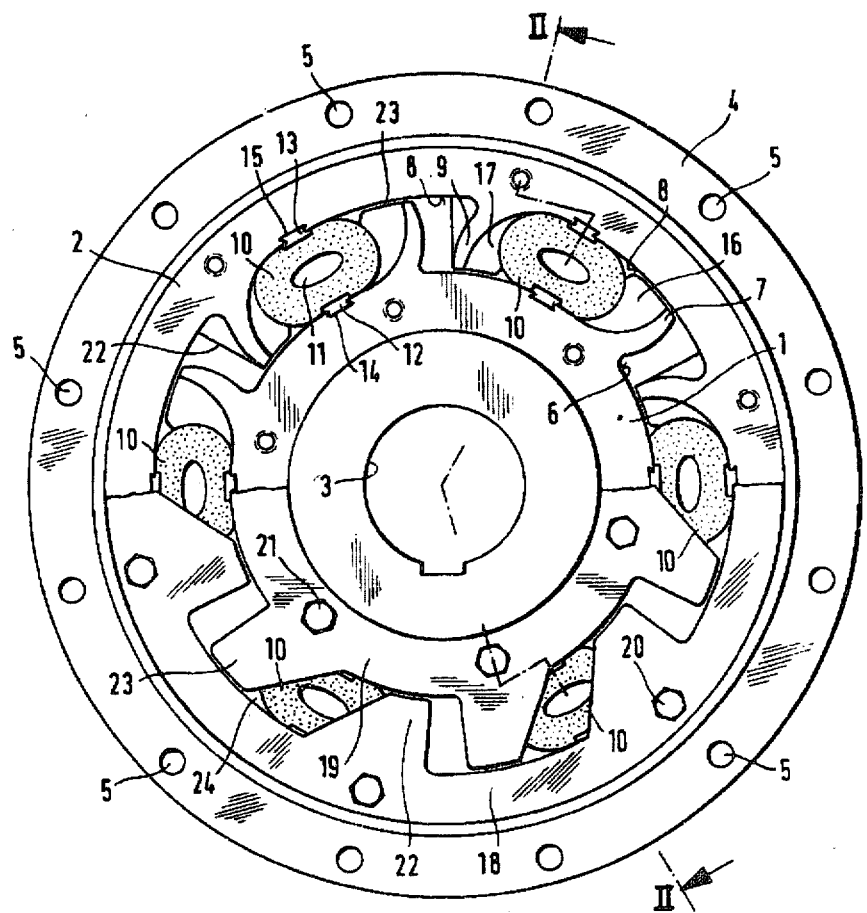
FIG. 1 is an end view of one exemplary embodiment of the inventive resilient shaft coupling, the top half thereof being sectioned in a plane transversely to the rotational axis.

According to the invention, starting from a resilient shaft coupling of the aforementioned general type, the resilient coupling members are secured to the generated surfaces of both the inner coupling ring and the outer coupling ring and, with the shaft coupling in its rest position, spaces are present between each resilient coupling member and each cam or dog of a pair of cams or dogs; these spaces enable the resilient coupling members to deform freely, in response to an initial shear stress, up to a predetermined level of shear stress, at which point the resilient coupling members engage substantially simultaneously with a chamber-delimiting cam or dog.

The shape of an individual resilient coupling member prior to installation basically resembles a circular-section rod. When the members have been installed, they are compressed relatively intensely by the radial loading force, so that their cross-sectional shape becomes substantially oval.

As a simple way of securing the resilient coupling members, retaining strips, which extend parallel to the rotational axis of the coupling, are disposed to part of their depth in, and are secured to, the coupling member on the radially opposite surfaces thereof; and a portion of the strip which projects radially from the resilient coupling member is retained in a companion recess in the wall of the inner and outer coupling rings. Advantageously, the retaining strips are secured to the resilient coupling member by vulcanization. Advantageously too, the projecting portion of a retaining strip is of dovetailed cross-section, and the respective receiving grooves in the inner and outer coupling rings are adapted to this cross-sectional shape.

The resilient deformability of resilient coupling members having predetermined external dimensions can be influenced as required; for example, the presence of a through-bore that is parallel to the rotational axis of the coupling, and is of a particular size, helps to increase resilience as compared with a solid resilient coupling member.

According to another feature of the invention, to close the chambers at their end faces, flat end rings are releasably secured one each to the inner and outer coupling rings on both end faces of the latter, there being formed on the end rings teeth which are radially adjacent one another and which mesh alternately with a gap between them; each two teeth, that are disposed in circumferentially consecutive relationship on the same end face, form a pair and cooperate to delimit a chamber. In such an embodiment, with the coupling in its rest position, the gap between the teeth of a pair is at least large enough to ensure that when the predetermined shear stress level of the resilient coupling members is reached, i.e., after an appropriate rotation of the coaxial coupling rings relative to one another, the teeth do not abut one another. Also, these teeth can provide abutment means to stop rotation after the maximum torque has been reached.

A main advantage provided by the invention as compared with a known resilient positive coupling is that very low torsional stiffnesses, and correspondingly high angles of rotation, are possible at low torques because at low torques the resilient coupling members, unlike what happens in a positive or dog coupling, can be stressed initially only in shear. This shear stressing is made possible by the gaps or spaces present between a resilient coupling member and the cams or dogs of a pair that delimits the associated chamber. The cams or dogs of the two coupling rings engage the resilient coupling members to inhibit any further free deformation thereof only after the permissible shear stress arising from this free deformation has almost been reached. As the torque loading of the coupling increases, the stressing of the resilient coupling members changes from shear to compression. Starting with this operating condition, appropriately high torques can be transmitted just as in the case of conventional resilient dog couplings.

DESCRIPTION OF PREFERRED EMBODIMENTS

Referring now to the drawings in detail, the metal coupling parts of the resilient shaft coupling are formed by an inner coupling ring 1 and, coaxial thereto, an outer coupling ring 2, the inner ring 1 being provided with a central bore 3 to receive an input shaft or output shaft (not shown). The outer ring 2 has on its periphery a flange ring 4 that is provided with a number of through-bores 5 which are disposed equidistant from one another in such a way as to be consecutive in the circumferential direction, with the axes of the bores 5 being parallel to the axis of rotation of the coupling; the bores 5 are adapted to receive securing screws for securing the coupling to another drive element.

A plurality of substantially radially extending cams or dogs 7, which in cross-section are substantially sickle-shaped, are formed on the outer cylindrical generated surface 6 of the inner ring 1 and are consecutively disposed, equidistant from one another, in the circumferential direction. The free ends of the cams or dogs 7 extend to a location near the inner generated surface 8 of the outer ring 2. An equal number of cams or dogs 9 can be provided to extend radially inwardly from the surface 8; the cams or dogs 9 have the same cross-sectional shape as do the cams or dogs 7, but with their sickle curvature oriented in the opposite direction.

Each outer-ring cam 9 forms a pair with an inner-ring cam 7 which is next to the cam 9 in the circumferential direction. Each cam pair 9, 7 delimits an axially disposed chamber, six of which are shown in the illustrated embodiment. Disposed in each chamber is a resilient coupling member 10 which is made of rubber or the like, and the axial length of which corresponds to the axial length of the chamber, i.e., the axial length of the coupling rings 1, 2. The resilient coupling members 10 have the shape of a circular-section rod before being installed; once installed, they are compressed radially and assume the oval cross-sectional shape visible in FIG. 1. This compression subjects the members 10 to a predetermined radial loading. Each member 10 is provided with a through-bore 11 which is circular to start with and which the compression makes oval, as can be seen in FIG. 1. The resilience of the members 10 and, therefore, the torsional stiffness of the coupling can be varied by varying the size of the cross-section of the bore 11.

At their engagement or bearing surfaces, the members 10 are secured to the inner ring 1 and to the outer ring 2. To this end, each such surface has at its center, in a groove that extends parallel to the rotational axis of the coupling, a retaining strip 12, 13, a projecting portion of which is of dovetailed cross-section. The strips 12, 13 are rigidly secured to the resilient coupling member 10, preferably by vulcanization. The projecting dovetailed portions of the strips 12, 13 are retained positively in companion grooves 14, 15 in the inner and outer coupling rings 1, 2 respectively. To introduce a member 10 into its operative position, the appropriately compressed resilient coupling member is introduced axially from one end face so that its two strips 12, 13 engage in the grooves 14, 15.

FIG. 1 shows the resilient shaft coupling in its unloaded normal position. In this position the members 10 do not fill the chamber completely in the circumferential direction; instead, there is a gap or space 16, 17 at the front and at the rear. When the coupling starts to take up a load, i.e., when, for example, the outer ring 2 rotates clockwise relative to the inner ring 1, the spaces or gaps 16, 17 enable the members 10 to deform freely at first so that they are stressed in shear.

The size of the gaps or spaces 16, 17 is such that when the shear stressing of the members 10 reaches a predetermined level, the associated cams or dogs 7, 9 engage substantially simultaneously with the opposite generated surfaces of the members 10, whereafter the members 10 are no longer free to deform and can be stressed only by compression.

In the first phase of coupling loading, the torsional stiffness of the coupling is determined only by the shear forces associated with the free deformation of the members 10. Since these forces are relatively low, the shaft coupling has a very low torsional stiffness during the starting phase, with this starting stiffness resulting solely from shear stressing of the resilient members 10 and being exactly definable, even for zero torque. Another advantage is that in this first loading phase, which is associated with very low torsional stiffness, the two metallic parts of the coupling engage one another without clearance or play.

After the spaces 16, 17 have been taken up i.e., after the cams or dogs 7, 9 of each pair have engaged with the associated resilient member 10, the members 10 can no longer be deformed freely, the stressing of the members 10 changing from shear to compression. The coupling can now transmit the specified high torque with an appropriately high torsional stiffness.

It has been found that the amount of free deformation of the members 10 can be slightly greater at the front than at the rear. To ensure that the cams or dogs 7, 9 nevertheless engage substantially simultaneously after termination of the free deformation phase of the members 10, the gap width of the space 16 at the front is slightly greater than at the back of the associated member 10.

A flat outer end ring 18, and a flat radially inner end ring 19 of the same strength or thickness, are provided to close the chambers at both of their end faces. The end rings on the opposite side of the shaft coupling are similar and therefore do not have different reference numerals in the drawings. Each of the two rings 18, 19 is releasably secured to the rings 2, 1 respectively by means of threaded bolts 20, 21 respectively which engage in tapped or threaded bores in the rings 2, 1, with those bores extending parallel to the rotational axis of the coupling. On their adjacent axial generated surfaces, the rings 18, 19 are provided with teeth 22, 23 which mesh with one another with clearance, and the free ends of which extend to near the pertaining opposite generated surface.

As FIG. 1 shows, the teeth 22, 23 are trapezoidal, with the inclined flanks of any two consecutive teeth 22, 23 facing one another. Any two teeth 22, 23 whose inclined flanks face one another form a pair and cooperate to delimit a chamber on their end face; with the coupling in its normal position, the teeth 22, 23 of a pair are disposed substantially symmetrically relative to the central axis of the chamber, and partly cover the front and rear ends of the associated member 10. A gap 24 is left between the teeth 22, 23 of a pair and is at least large enough to ensure that when the predetermined level of shear stress of the resilient members 10 is reached, the teeth 22, 23 do not abut one another.

A resilient shaft coupling of this kind is of use only for unidirectional operation. If it is required to make use of the advantages of the shaft coupling for reversible drives, two consecutive individual couplings for opposite drive directions can readily be provided.

The present invention is, of course, in no way restricted to the specific disclosure of the specification and drawings, but also encompasses any modifications within the scope of the appended claims.

What I claim is:

1. In a resilient shaft coupling having two metal parts, one of which can be connected to an input, the other to an output, with torque being adapted to be transmitted between these metal coupling parts via a number of resilient coupling members, of rubber material, that are consecutively disposed in the circumferential direction, whereby said two metal coupling parts include an inner coupling ring and, coaxial thereto, an outer coupling ring, with those generated surfaces of said coupling rings that face one another having formed thereon a number of essentially radially extending cams that alternately interengage one another in the circumferential direction, and that extend over the axial length of said coupling rings, with said cams of one of said coupling rings extending nearly to the facing generated surface of the other of said coupling rings, whereby one side of each of said cams is concave and faces a concave side of a circumferentially adjacent one of said cams, with those cams that have their concave sides facing one another forming respective pairs of cams, each pair delimiting a chamber in which is disposed one of said resilient coupling members, with the longitudinal axis of said chamber extending parallel to the axis of rotation of said coupling, whereby prior to installation, each of said resilient coupling members essentially has the shape of a circular rod with a length that corresponds approximately to the axial length of said coupling rings, and whereby in the installed state, said coupling members are subjected to a predetermined radial loading, the improvement in combination therewith wherein:

each of said resilient coupling members is secured to both of said facing generated surfaces of said coupling rings, whereby when said coupling is in an inoperative and relatively non-loaded state, respective free spaces are provided remaining in said chambers at locations between each of said coupling members before and after each respective resilient coupling member adjacent to each cam of a pair of cams; said free spaces, in response to an initial shear stress on said resilient coupling members extending over the entire radial height of the chambers enable the resilient coupling members to deform freely as a positive type resilient shaft coupling in such a way that its torsional stiffness is very reduced at low torques, that it retains this low torsional stiffness at zero average useful torque until a predetermined shear stress level is reached accompanied by free deformation of the resilient coupling members as far as to an angular rotation of the pair of cams permitted and made possible by the free spaces relative to the respective resilient coupling member as far as to a predetermined point where the free spaces are substantially eliminated due to deformation of said resilient coupling member, at which point a change from shear to presure loading occurs so that said resilient coupling members nearly simultaneously come into contact with facing ones of said concave sides of said cams that delimit said chambers within closed confines thereof so that the resilient coupling members of the positive type resilient shaft coupling operate under load in this condition without clearance and without any impairment of torsional stiffness at full load.

2. A resilient shaft coupling in combination according to claim 1, in which at both axial end faces, each of said coupling rings is provided with respective flat end rings that are detachably secured thereto; at a given axial end of said coupling, said end rings of said coupling rings have formed thereon teeth that extend radially, alternate with one another in the circumferential direction, and intermesh with clearance on both sides, with alternating ones of said teeth being grouped in pairs that respectively cooperate to delimit one end face of a given one of said chambers that are also delimited by said cams.

3. A resilient shaft coupling in combination according to claim 2 in which in an inoperative state of said coupling, a gap exists between said teeth of a given pair of teeth that is great enough to ensure that when said predetermined shear stress level of said resilient coupling members is reached, said teeth do not butt against one another.

4. A resilient shaft coupling in combination according to claim 3, in which a given resilient coupling member is secured to said facing generated surfaces of said coupling rings on radially opposite surfaces of said coupling member, with each of said last-mentioned surfaces having disposed partly therein, and secured thereto, a respective retaining strip that extends parallel to the axis of rotation of said coupling; each of said retaining strips has a portion that projects radially beyond said coupling member and is retained in a companion recess in the pertaining generated surface of said coupling rings.

5. A resilient shaft coupling in combination according to claim 4, in which said retaining strips are secured to said coupling members via vulcanization.

6. A resilient shaft coupling in combination according to claim 4, in which said projecting retaining strip portions, and said companion recesses in said coupling rings, have corresponding dovetail shapes.

7. A resilient shaft coupling in combination according to claim 4, in which each of said resilient coupling members has a central through-bore that extends parallel to the axis of rotation of said coupling.

* * * * *